No. 855,760. PATENTED JUNE 4, 1907.
A. DU BRAU.
HEATER FOR SMOOTHING IRONS.
APPLICATION FILED JUNE 22, 1906.

2 SHEETS—SHEET 1.

Witnesses
Inventor
Anna Du Brau
By James Sheehy
Attorney

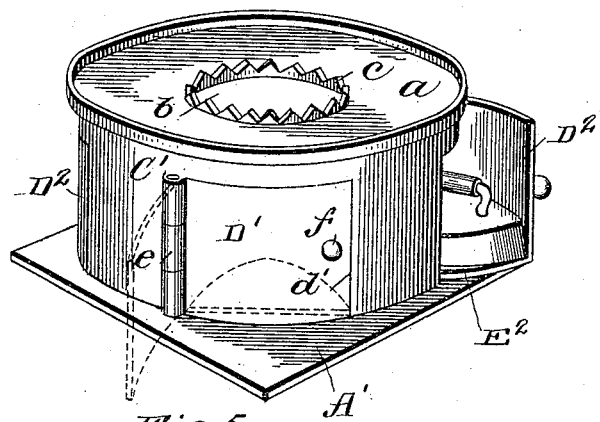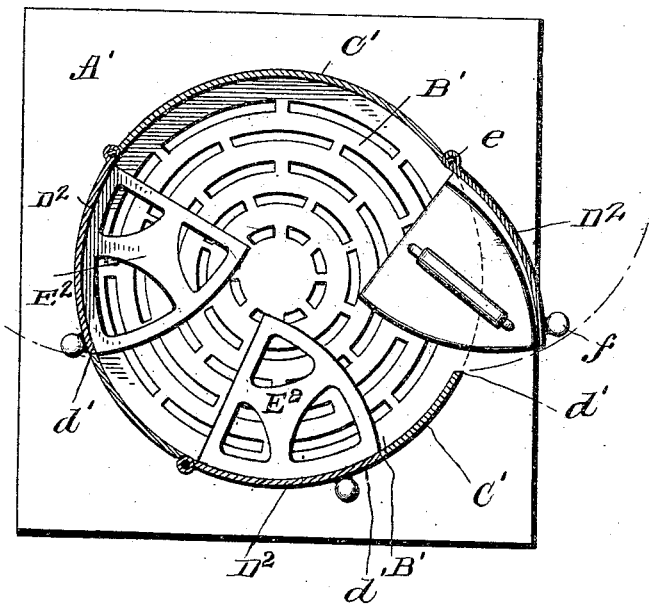

UNITED STATES PATENT OFFICE.

ANNA DU BRAU, OF BALTIMORE, MARYLAND.

HEATER FOR SMOOTHING-IRONS.

No. 855,760.        Specification of Letters Patent.        Patented June 4, 1907.

Application filed June 22, 1906. Serial No. 322,863.

*To all whom it may concern:*

Be it known that I, ANNA DU BRAU, a citizen of the United States, residing at Baltimore, in the State of Maryland, have invented new and useful Improvements in Heaters for Smoothing-Irons, of which the following is a specification.

My invention pertains to heaters for smoothing-irons; and it contemplates the provision of a simple, compact and inexpensive heater constructed with a view of facilitating the insertion and removal of the smoothing-irons, and adapted to utilize the surplus heat for cooking purposes.

Figure 1:
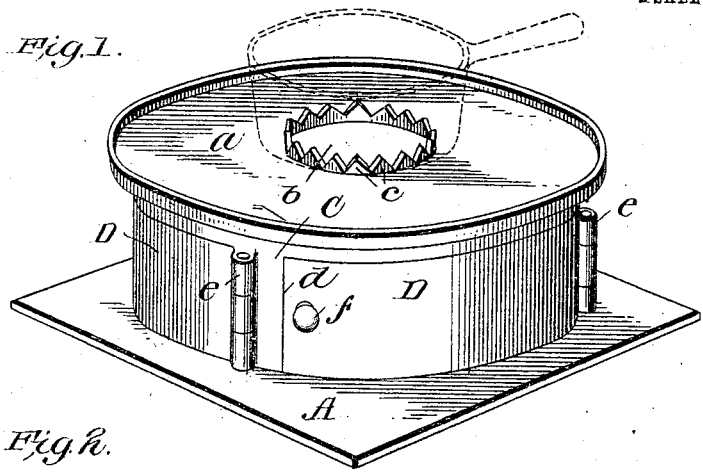
Figure 2:
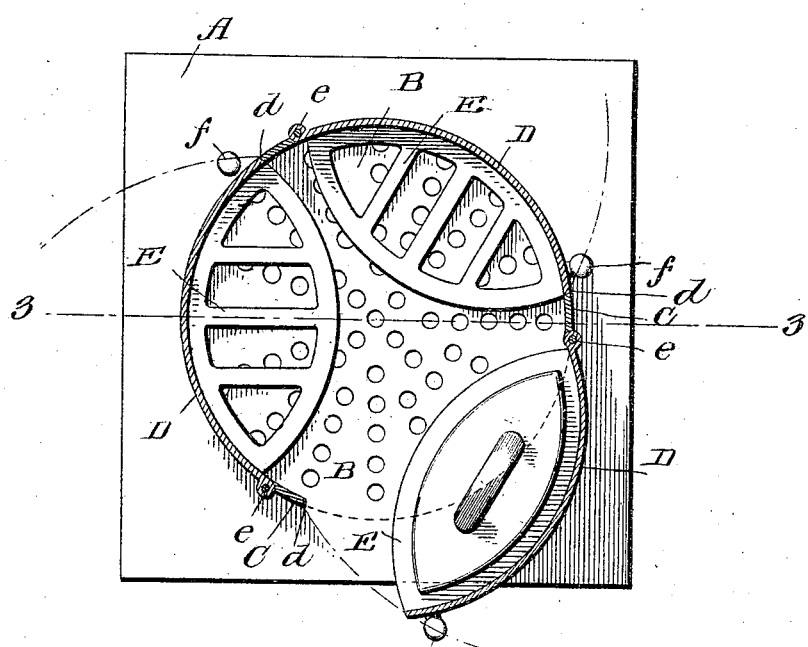
Figure 3:
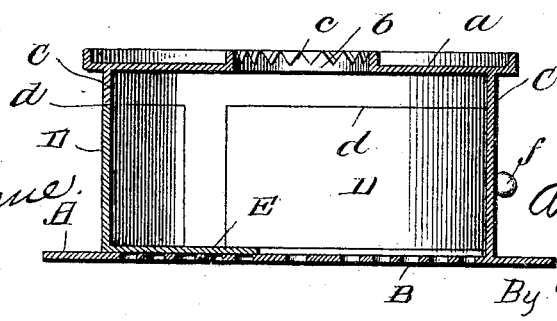

Other advantageous characteristics of my invention will be fully understood from the following description and claims when the same are read in connection with the accompanying drawings, forming part of this specification, in which:

Figure 1 is a perspective view of a heater embodying my invention and designed to hold smoothing-irons of general elliptical form. Fig. 2 is a horizontal section of the heater taken through the body and the doors thereof. Fig. 3 is a detail diametrical section taken in the plane indicated by the line 3—3 of Fig. 2. Fig. 4 is a perspective view of a modification of the invention, designed to heat the ordinary domestic smoothing-irons. Fig. 5 is a horizontal section of the modification taken through the doors in a plane above the iron supporting platforms thereof.

Referring by letter to the said drawings, and more particularly to Figs. 1 to 3 thereof: A is the base of my novel heater which is provided with a central foraminated portion B to permit of the upward passage of flames and other products of combustion from the gas or other burner over which the base is designed to be placed. The said base is preferably in the form of a flat plate adapted to be placed on a gas stove and over a burner thereof. C is the body or drum of the heater. This body or drum C is fixed to and rises from the base A, around the foraminated portion B, and is provided with a top *a* in which is a central opening *b*, surrounded by a serrated flange *c* as shown. In its side wall the said body C has three equi-distant openings *d* of about the proportional size illustrated, and these openings, which are designed for the insertion and removal of the irons to be heated, are controlled by doors D of about the proportional size illustrated. The said doors D are hinged at one end to the side wall of body C, as indicated by *e*, and are provided adjacent to their opposite or free ends with knobs *f*, whereby they may be readily opened and closed. They are also provided with platforms E which are fixed to and extend inwardly from their lower edges as best shown in Fig. 2. The said platforms E are designed when the doors are closed to assume positions above and rest on the foraminated portion B of base A, and they are each perforated or of open work construction as shown so as to permit the flame from the burner over which the heater is placed to strike directly against the bottoms of the irons.

In the practical use of the novel heater described, the base A is arranged with the foraminated portion B over a gas burner or over any other suitable source of heat, and while the doors D are open, the irons to be heated are placed on the platforms E, and the doors are closed. When this is done it will be apparent that the irons on the platforms E will be carried to positions above the foraminated portion B of the base where they will be presented to the best advantage to the heat afforded by the burner. After the doors D have been closed for a period sufficiently long to assure the proper heating of the irons, the said doors are swung open, when as will be readily understood the handles of the irons may be engaged therewith, and the irons may be conveniently removed from the platforms E. It will be gathered from the foregoing that the irons may be readily placed on the platform E and moved through the medium of the doors D into the drum-like body C to be heated, and that after the irons are heated and the doors D are swung open the irons may with equal facility be removed from the platforms E. It will also be gathered that when the irons are positioned in the drum-like body C they are presented to the best advantage to all of the heat afforded by the burner over which the base A is arranged; the said heat being retained by the said body in contact with the irons.

The opening *b* in the top *a* of body C is for the escape of the surplus heat from the burner, and it will be readily understood that when a cooking vessel is positioned on the serrated flange *c* around said opening, as shown by dotted lines in Fig. 1, such surplus heat may be utilized to advantage for cooking purposes.

When it is desired to maintain a very high temperature in the drum-like body C with a view of quickly and highly heating the irons, the opening $b$ may be closed by a suitable flanged cap placed over the serrated flange $c$. I have deemed it unnecessary, however, to illustrate the said flanged cap inasmuch as I generally prefer to use the heater for the two purposes stated, viz: to heat smoothing-irons and to heat the contents of a cooking vessel arranged on the serrated flange $c$.

The modified heater shown in Figs. 4 and 5 comprises a base A', but the central portion B' of this base A' differs from that of the base A in the shape of its openings. The drum-like body C' of the modified construction, has an opening $b$ in its top $a$ and a serrated flange $c$ surrounding said opening, and it also has openings $d'$ in its side wall, which openings $d'$ are smaller in size than the openings $d$ of the construction in Figs. 1 to 3 for a reason which will presently appear. The openings $d'$ are controlled by doors $D^2$, and these doors are hinged to the body C', and are provided with inwardly extending, open work platforms $E^2$ which are fixed to and extend inward from their lower edges. These platforms $E^2$ serve the same purpose as the platforms E of the embodiment shown in Figs. 1 to 3, but they differ from the said platforms E in that they are shaped, as best shown in Fig. 5, to carry the ordinary irons such as are to be found in every household.

The mode of using the modified heater shown in Figs. 4 and 5 will be readily understood from the foregoing, and it will be noticed that the said modified heater is possessed of all the practical advantages ascribed to the device shown in Figs. 1 to 3.

I have entered into a detailed description of the construction and relative arrangement of the parts comprised in the present and preferred embodiments of my invention in order to impart a definite understanding of the said embodiments. I do not desire, however, to be understood as confining myself to the said specific construction and relative arrangement of parts as such changes or modifications may be made in practice as fairly fall within the scope of my invention as claimed.

Having described my invention, what I claim and desire to secure by Letters-Patent, is:

1. A device for heating smoothing irons, comprising a base having an open-work central portion designed to be positioned over a source of heat, a hollow body, of circular form in horizontal section, fixed to the base around the open-work portion thereof and having openings at intervals in its circular side wall, horizontally-swinging doors curved in conformity to the circular side wall of the body and hinged to said wall and arranged to close the openings therein, and horizontal, open-work, iron-supporting platforms fixed to the doors to move in and out through the openings in the side wall of the body and arranged immediately above the base, whereby they are supported by said base when the doors are closed and also when said doors are open.

2. A device for heating smoothing irons, comprising a base having an open-work central portion designed to be positioned over a source of heat, a hollow body, of circular form in cross-section, fixed to the base around the open-work portion thereof and having openings at intervals in its circular side wall and also having an opening in its top surrounded by an upwardly extending, serrated flange, horizontally swinging doors curved in conformity to the circular side wall of the body and hinged to said wall and arranged to close the openings therein, and horizontal, open-work, iron-supporting platform fixed to the doors to move in and out through the openings in the side wall of the body and arranged immediately above the base, whereby they are supported by said base when the doors are closed and also when the doors are open.

In testimony whereof I have hereunto set my hand in presence of two subscribing witnesses.

ANNA DU BRAU.

Witnesses:
  HERMAN DU BRAU,
  A. S. BREWER.